(12) United States Patent
Hong

(10) Patent No.: US 11,880,164 B2
(45) Date of Patent: Jan. 23, 2024

(54) MODULE CONTROLLING VIEWING WINDOW, DEVICE FOR HOLOGRAM DISPLAY AND METHOD FOR DISPLAYING HOLOGRAM

(71) Applicant: ELECTRONICS AND TELECOMMUNICATIONS RESEARCH INSTITUTE, Daejeon (KR)

(72) Inventor: Kee Hoon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 17/546,710

(22) Filed: Dec. 9, 2021

(65) Prior Publication Data

US 2022/0214646 A1    Jul. 7, 2022

(30) Foreign Application Priority Data

Jan. 4, 2021  (KR) .................. 10-2021-0000308
Dec. 3, 2021  (KR) .................. 10-2021-0172084

(51) Int. Cl.
*G03H 1/22* (2006.01)
*G03H 1/00* (2006.01)

(52) U.S. Cl.
CPC ......... *G03H 1/0005* (2013.01); *G03H 1/2202* (2013.01); *G03H 2001/0088* (2013.01); *G03H 2001/2231* (2013.01)

(58) Field of Classification Search
CPC .............. G03H 1/0005; G03H 1/2202; G03H 2001/0088; G03H 2001/2231; G03H 2223/24
(Continued)

(56) References Cited

U.S. PATENT DOCUMENTS 5,475,533 A * 12/1995 Steenblik ............... G02B 5/00
                                                        359/623
2005/0180019 A1* 8/2005 Cho ...................... H04N 13/365
                                                        359/626
(Continued)

FOREIGN PATENT DOCUMENTS

JP     07-084215 A     3/1995
JP     2003-315725 A  11/2003
(Continued)

OTHER PUBLICATIONS

KIPO Office Action, dated Sep. 20, 2023, for Korean Patent Application No. 10-2021-0172084 which corresponds to the above-identified U.S. application.

*Primary Examiner* — Audrey Y Chang
(74) *Attorney, Agent, or Firm* — LRK PATENT LAW FIRM

(57) ABSTRACT

Disclosed herein a module controlling viewing window, a device for hologram display and a method for displaying hologram. The module controlling viewing window includes: a viewing window forming unit having a first reflective optical system that receives an incident light and forms a viewing window in a user's viewing region; and a viewing angle expanding unit having a second reflective optical system that is arranged in one direction on the viewing window forming unit and expands a viewing angle of the viewing window.

16 Claims, 10 Drawing Sheets

(58) Field of Classification Search
USPC .................. 359/32, 627, 628, 626, 631, 459
See application file for complete search history.

(56) References Cited

U.S. PATENT DOCUMENTS

| | | | |
|---|---|---|---|
| 2008/0198431 A1* | 8/2008 | Schwerdtner | G03H 1/0866 |
| | | | 359/32 |
| 2016/0209808 A1 | 7/2016 | Byun et al. | |
| 2016/0216691 A1 | 7/2016 | Kim et al. | |

FOREIGN PATENT DOCUMENTS

| | | |
|---|---|---|
| KR | 10-2015-0079996 A | 7/2015 |
| KR | 10-2016-0126902 A | 11/2016 |
| KR | 10-2019-0080808 A | 7/2019 |
| WO | 2020-157562 A1 | 8/2020 |

\* cited by examiner

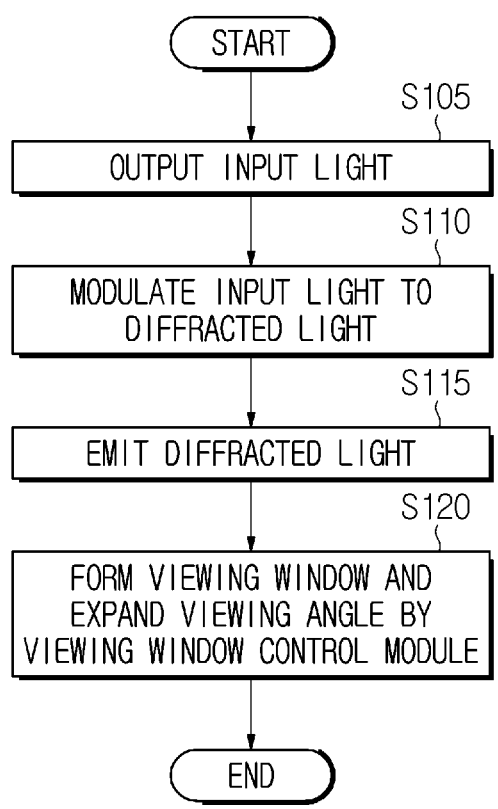

MODULE CONTROLLING VIEWING WINDOW, DEVICE FOR HOLOGRAM DISPLAY AND METHOD FOR DISPLAYING HOLOGRAM

CROSS REFERENCE TO RELATED APPLICATIONS

The present application claims priority to Korean patent applications 10-2021-0000308, filed Jan. 4, 2021 and 10-2021-0172084, filed Dec. 3, 2021, the entire contents of which are incorporated herein for all purposes by this reference.

BACKGROUND OF THE INVENTION

1. Field of the Invention

The present disclosure relates to a viewing window control module and a device and a method for hologram display and, more particularly, to a viewing window control module and a device and a method for hologram display, which realize the location accuracy of an optical system, the simplicity of a device configuration, and wavelength independence.

2. Description of Related Art

The digital holographic display technology produces a 3D display satisfying every condition for 3D image recognition. Viewing conditions such as a hologram image size played on a digital holographic display and a viewing angle may be determined based on standards like a size and a pixel size of a spatial light modulator (SLM), which provides a hologram image. As there are restrictions on the conventional standards for SLMs, it is difficult to improve viewing conditions up to a satisfactory level. In order to overcome this difficulty, various types of holographic display techniques like the application of a temporal/spatial multiplexing technique and viewing window projection have been proposed.

Among those techniques, the viewing window projection type digital holographic display delivers all the image information diffracted at a spatial light modulator (SLM) to a viewing window in a limited region through a predetermined lens, thereby enabling a user to watch a three-dimensional image without loss of hologram image information at the SLM.

Specifically, a viewing window type hologram display utilizes coherence characteristics due to the diffraction of light. In a viewing window type display, the diffraction power is determined according to a pixel size of a spatial light modulator, and the diffraction power may determine a viewing window at which a viewer may stare. In other words, as the pixel size of a spatial light modulator is smaller, the diffraction power is larger, and as the diffraction power is improved, the viewing window becomes larger. However, as the pixel size is related to resolution and thus is subject to limitations in a process, the pixel size of a spatial light modulator cannot be unlimitedly reduced. Furthermore, as an increase of pixel size is accompanied by an increase of resolution, data traffic also increases so that data operation may become as burdensome as the increase of resolution.

SUMMARY

The present disclosure is technically directed to provide a viewing window control module and a device and a method for hologram display, which realize the location accuracy of an optical system, the simplicity of a device configuration, and wavelength independence.

The technical objects of the present disclosure are not limited to the above-mentioned technical objects, and other technical objects that are not mentioned will be clearly understood by those skilled in the art through the following descriptions.

According to the present disclosure, there is provided a viewing window control module applied to a hologram display device, the viewing window control module comprising: a viewing window forming unit having a first reflective optical system that receives an incident light and forms a viewing window in a user's viewing region; and a viewing angle expanding unit having a second reflective optical system that is arranged in one direction on the viewing window forming unit and expands a viewing angle of the viewing window.

According to the embodiment of the present disclosure in the viewing window control module, the viewing angle expanding unit may be machined and formed on the viewing window forming unit. According to the embodiment of the present disclosure in the viewing window control module, the first reflective optical system may be configured in a concave mirror shape.

According to the embodiment of the present disclosure in the viewing window control module, a distance of the viewing window may be determined by a radius of curvature of the first reflective optical system.

According to the embodiment of the present disclosure in the viewing window control module, the viewing angle expanding unit may have a plurality of second reflective optical systems that are sequentially arranged at a predetermined pitch in the one direction on a light receiving surface of the viewing window forming unit.

According to the embodiment of the present disclosure in the viewing window control module, the second reflective optical system may have an arrangement pitch based on a pixel pitch of a spatial light modulator from which the incident light is output.

According to the embodiment of the present disclosure in the viewing window control module, the second reflective optical system may be configured as a micro-concave mirror.

According to the embodiment of the present disclosure in the viewing window control module, the viewing angle may be determined by a diameter of the micro-concave mirror and a radius of curvature of the micro-concave mirror.

According to the embodiment of the present disclosure in the viewing window control module, the second reflective optical system may be configured as a micro-convex mirror.

According to another embodiment of the present disclosure, there is provided a hologram display device, the device comprising: a spatial light modulator configured to include a plurality of pixels and to modulate an input light to a diffracted light; a lens unit configured to emit the diffracted light; and a viewing window control module configured to provide the emitted diffracted light to a user's viewing region. The viewing window control module comprises: a viewing window forming unit having a first reflective optical system that receives the emitted diffracted light and forms a viewing window in the viewing region; and a viewing angle expanding unit having a second reflective optical system that is arranged in one direction on the viewing window forming unit and expands a viewing angle of the viewing window.

According to the embodiment of the present disclosure in the device, the emitted diffracted light may be configured to be irradiated on-axis to the viewing window control module or to be irradiated off-axis to the viewing window control module, by using a beam splitter.

According to another embodiment of the present disclosure, there is provided a method for displaying hologram, the method comprising: modulating, by a spatial light modulator including a plurality of pixels, an input light to a diffracted light; emitting, by a lens unit, the diffracted light; and providing, by a viewing window control module, the emitted diffracted light to a user's viewing region. the providing to the viewing region comprises: receiving the emitted diffracted light, by a viewing window forming unit having a first reflective optical system, and forming a viewing window on the viewing region; and expanding, by a viewing angle expanding unit having a second reflective optical system arranged in one direction on the viewing window forming unit, a viewing angle of the viewing window.

According to the present disclosure, it is possible to provide a viewing window control module and a device and a method for hologram display, which realize the location accuracy of an optical system, the simplicity of a device configuration, and wavelength independence.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 11 is a flowchart for a hologram display method according to yet another embodiment of the present disclosure.

DETAILED DESCRIPTION

Figure 1:
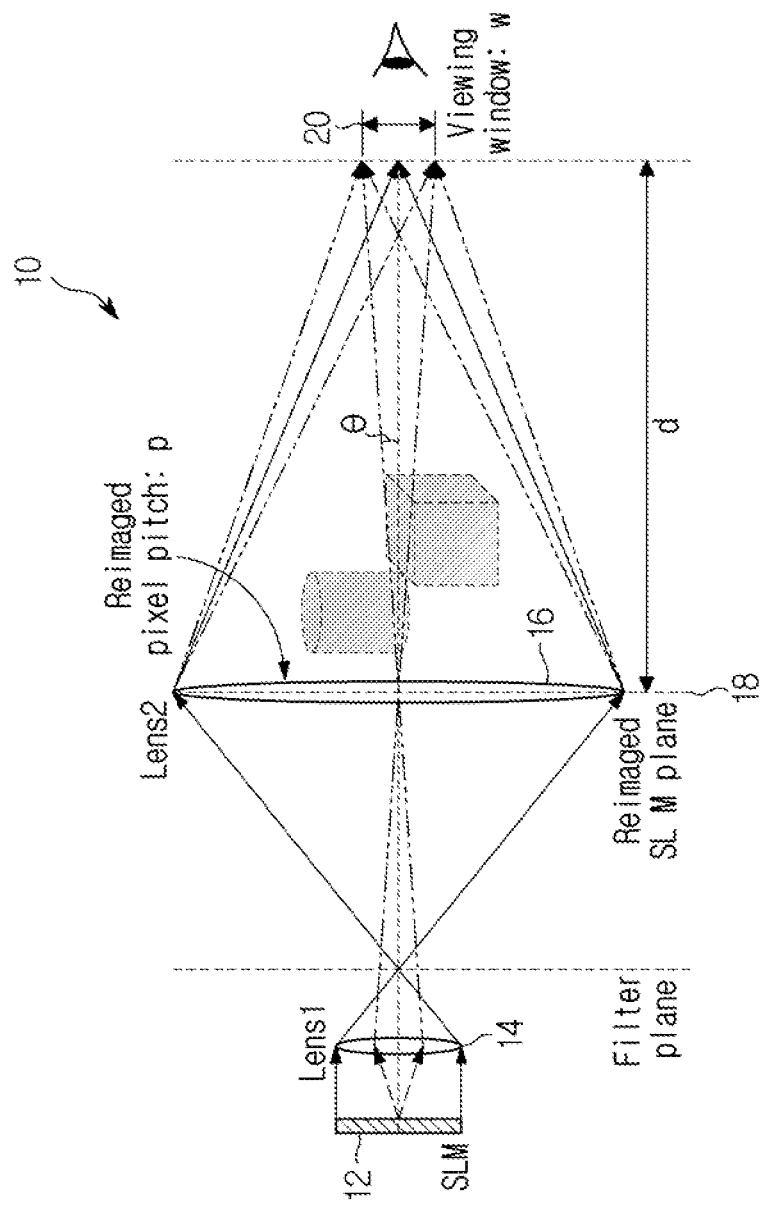
FIG. 1 is a view schematically illustrating a configuration of a conventional hologram display device.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present disclosure, expressions of location relations used in the present specification such as "upper", "lower", "left" and "right" are employed for the convenience of explanation, and in case drawings illustrated in the present specification are inversed, the location relations described in the specification may be inversely understood.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

For clear comparison with a hologram display device according to the present disclosure, a hologram display device with a conventional viewing window control module will be described first.

FIG. 1 is a view schematically illustrating a configuration of a conventional hologram display device. The conventional hologram display device is a viewing window projection type display.

The conventional hologram display device 10 may include a spatial light modulator 12 configured to diffract and modulate light, which is input from a light source, a field lens 14 that focuses and emits the diffracted light, and a rear lens 16 that provides image information by conveying the emitted light to a user's viewing region. In order to realize the viewing window type, as shown in the reference number 24 of FIG. 5, the conventional display device may have an element for controlling a viewing angle placed on an emitting plane of the rear lens 16. The element may be an asymmetric scatter plate which consists of a lenticular lens array (refer to 24 of FIG. 5), a linear grating, a holographic diffuser and the like. The rear lens 16 may function as a field lens in the back, and the rear lens 16 and the above-mentioned elements may constitute a conventional viewing angle control module.

Using a viewing window distance (d) determined by a pixel size of a spatial light modulator 104 and a focal distance of the field lens 14, the size (w) of a viewing window 118 formed through the conventional viewing angle control module may be calculated by Equation (1).

$$w \approx 2\theta d = d\lambda/p \qquad \text{Equation (1)}$$

A viewing angle (θ) forming the viewing window is determined by the pixel size (p) of the spatial light modulator 104 and a magnification of an optical system, that is, the rear field lens 16. When the pixel size of the spatial light modulator 104, which is magnified on an image plane (or reimaged SLM plane) 18, is p, the viewing angle may be defined by Equation (2).

$$\theta = \sin^{-1}(\lambda/2p) \qquad \text{Equation (2)}$$

However, in some cases, a viewing region, which generally corresponds to a size of the viewing window 20, is so small that a viewer has no choice but to watch a hologram at a fixed position. In order to improve this disadvantage, methods for using an asymmetric scatter plate of the above-described element have been proposed. The asymmetric scatter plate may be an optical component that diffuses incident light only in one direction and transmits light without modulation in a direction perpendicular to the diffusing direction. When the asymmetric scatter plate is placed on the image plane 18 (reimaged SLM plane) of a hologram reproduced on the spatial light modulator 12, the size (w) of the viewing window 20 may be expanded in the diffusing direction of the symmetric scatter plate. Although not illustrated in FIG. 1, there may be an additional optical system between the spatial light modulator 12 and the rear filed lens 16. The additional optical system may be a relay optical system such as a 4f optical system for filtering optical noises, and the relay optical system may be placed between the spatial light modulator 12 and the rear field lens 16. For the additional optical system, a filtering method may be used which places a spatial filter (SF) on the focal plane of the field lens 14 and uses single-sideband modulation. To use the filtering method, a 4f optical system may be placed. In case of using the 4f optical system, a spatial filter (SF) is located on a back focal plane of the field lens 12, that is, on a Fourier plane, and a hologram is Fourier transformed to filter a conjugate component and a DC component for an object wave in an optical signal so that only an effective component signal (single-sideband signal) with a noise component being removed may be obtained. Thus, the rear field lens 16 may display the transformed effective component in a space. Like this, when there is an additional optical system such as a 4f optical system, the image plane may be an additional image plane formed between the spatial light modulator 12 and the rear field lens 16.

The digital holographic display technology of viewing window projection type using the above-described asymmetric scatter plate has the following disadvantages.

An asymmetric scatter plate (refer to 24 of FIG. 5) should be ideally located on the image plane 18 of the spatial light modulator 12 constituting a viewing window type display. However, there is a problem that the rear field lens 16 for forming the viewing window 20 should also be located at the same position. Accordingly, when the asymmetric scatter plate (refer to 24 of FIG. 5) is placed adjacent to the rear field lens 16, the quality of a reproduced hologram image is degraded because of unintended diffracted light propagation. In another way, a relay optical system like a 4f optical system may be provided between the spatial light modulator 12 and the rear field lens 16 so that an additional image plane of the spatial light modulator 12 may be formed and the asymmetric scatter plate may be placed at the position of image plane. Nevertheless, a relay optical system is additionally needed, and the spatial cost and the design complexity increase.

In addition, a holographic display may generally have RGB lasers, which are three primary colors, as a light source. A lenticular array, a linear grating, and a holographic diffuser, which are mainly used as an asymmetric scatter plate, are optical elements that commonly have wavelength dependency. When the asymmetric scatter plates listed above are applied to a color holographic display using RGB lasers, problems like chromatic dispersion may occur in a reproduced hologram image due to wavelength dependency of the asymmetric scatter plates. As an asymmetric scatter platter is generally configured in a micro optical element structure with a periodic structure, it is very difficult or impossible to fabricate an achromatic feature compensating chromatic dispersion.

In order to solve the problems of location inaccuracy of the above-described asymmetric scatter plate, the placement of an additional optical system and wavelength dependency, an embodiment according to the present disclosure may be derived.

Hereinafter, embodiments of the present disclosure will be described with reference to the accompanying FIG. 2 to FIG. 11.

Figure 2:
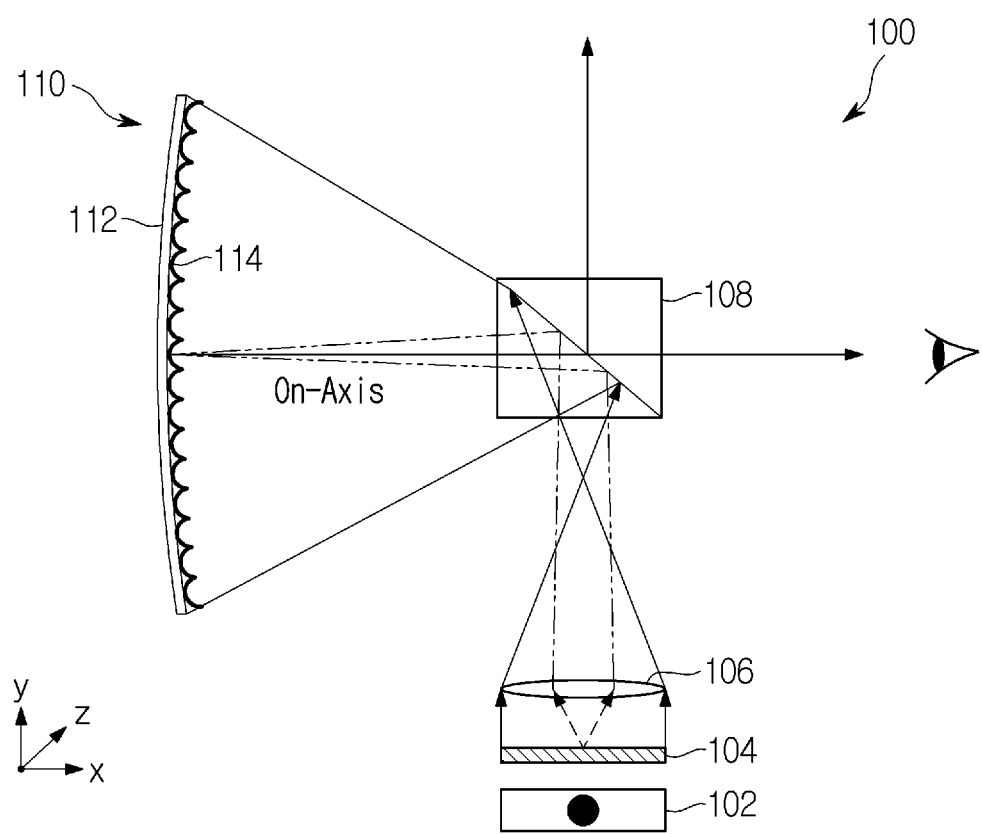
FIG. 2 is a view illustrating a configuration of a hologram display device according to an embodiment of the present disclosure.

FIG. 2 is a view illustrating a configuration of a hologram display device according to an embodiment of the present disclosure. A hologram display device according to the present disclosure may be a digital holographic display of viewing window projection type.

A hologram display device 110 may include a light source 102, a spatial light modulator 104 that diffracts and modulates light input from the light source 102, a lens unit 106 that focuses and emits diffracted light, a beam splitter 108 that splits and outputs a part of the emitted light, and a viewing window control module 110 that provides image information by relaying the output light to a user's viewing region.

The light source 102 may be configured as a RGB laser light source capable of outputting straight light to an emitting plane side. The light source 102 is adjacent to the spatial light modulator 104, and each image displayed in the pixels of the spatial light modulator 104 may be relayed straightly to the lens unit 106 corresponding to the pixel position.

The spatial light modulator 104 may display a hologram pattern and diffract and modulate light input from the light source 102. The spatial light modulator 104 may vary a hologram pattern displayed on each pixel according to control of an SLM controller (not shown). As a hologram pattern may vary according to a control signal of an SLM controller, a hologram display device according to the present disclosure may be a digital hologram display.

For example, the lens unit 106 may be a field lens having a lens shape with physical curvature on the surface or may be a liquid crystal panel that has a flat film shape or an optical function with modulation of refractive index.

In the hologram display device 110 according to the present disclosure, in order to enable incident light and emitted light to proceed coaxially (refer to c of FIG. 3) and thus to enable diffracted light emitted from the lens unit 106 to be incident on axis at the viewing window control module 110, the beam splitter 108 may split a part of the emitted diffracted light and irradiate the part to the viewing window control module 110.

Figure 3:
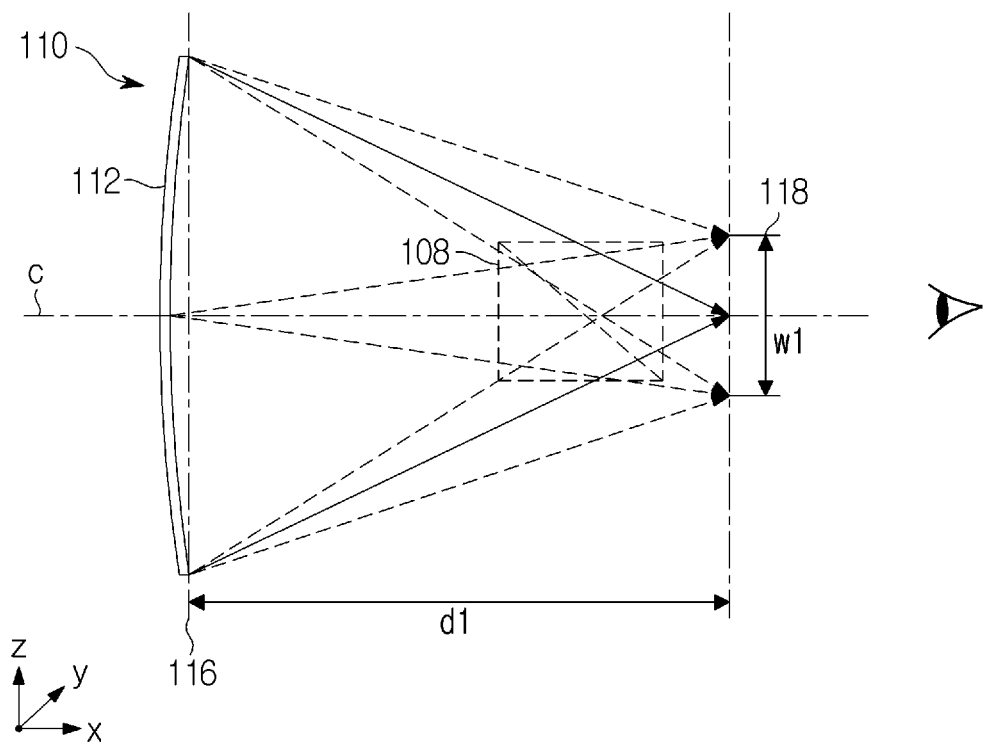
FIG. 3 is a view illustrating the formation of a viewing window by a viewing window forming unit according to an embodiment.
Figure 4:
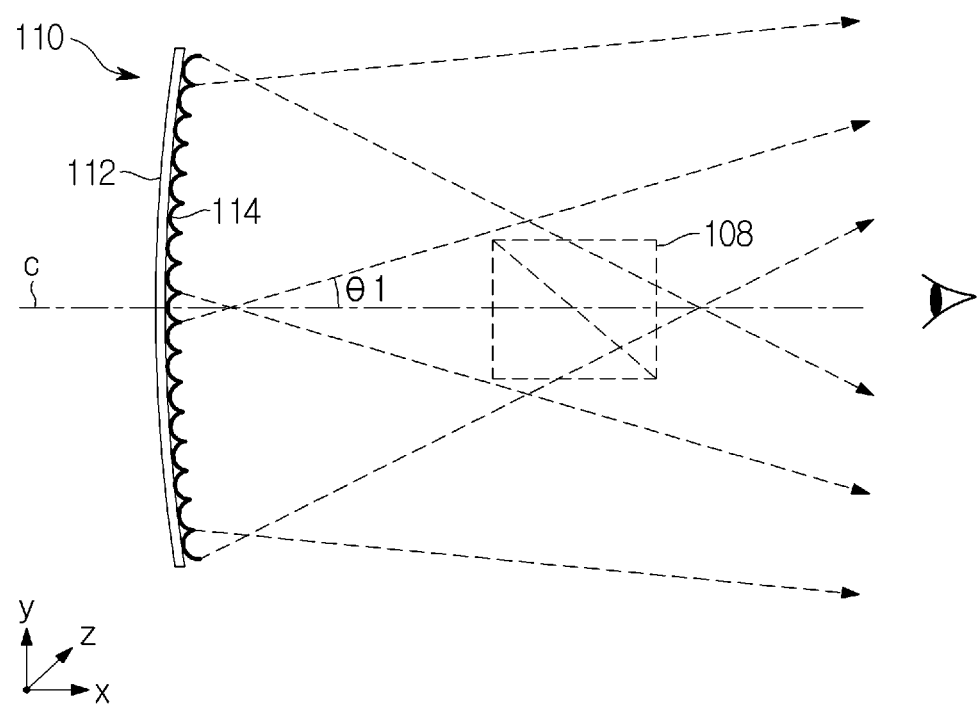
FIG. 4 is a view illustrating the expansion of a viewing angle by a viewing angle expanding unit according to an embodiment.

As exemplified in FIG. 2 to FIG. 4, the viewing window control module 110 may include a viewing window forming unit 112 equipped with a first reflective optical system that receives the emitted diffracted light and forms the viewing window 118 in a viewing region. In addition, the viewing window control module 110 may include a viewing angle expanding unit 114 having a second reflective optical system, which is arranged in one direction on the viewing window forming unit 112 (y-axis direction of FIG. 2) and expands the viewing angle (θ1) of the viewing window 118. FIG. 3 is a view illustrating the formation of a viewing window by a viewing window forming unit according to an embodiment, and FIG. 4 is a view illustrating the expansion of a viewing angle by a viewing angle expanding unit according to an embodiment.

The first reflective optical system of the viewing window forming unit 112 may be formed to have a light receiving surface with a concave mirror shape. The viewing angle expanding unit 114 may have a plurality of second reflective optical systems arranged sequentially in one direction (y-axis direction) at a predetermined pitch on the light receiving surface of the viewing window forming unit 112. The second reflective optical system may be configured as a micro-concave mirror. The viewing angle expanding unit 114 may be a reflective optical system that diffuses input light in one direction, for example, in the y-axis direction of FIG. 4, and outputs light without modulation in a direction perpendicular to the diffusing direction, for example, the z-axis direction of FIG. 3. In FIG. 2 to FIG. 4, the viewing angle expanding unit 114 is illustrated to be arranged in the y-axis direction but may be arranged in an arbitrary angular direction in another example.

For the location accuracy of optical systems of the viewing window forming unit 112 and the viewing angle expanding unit 114 and the simplification of a device configuration, the viewing angle expanding unit 114 may be machined and formed directly on the viewing window forming unit 112. Accordingly, the viewing angle expanding unit 114 and the viewing window forming unit 112 may have a consistent optical relation to each other. As illustrated in FIG. 3, since the viewing angle expanding unit 114 is machined directly on the viewing window forming unit 112 so that the viewing angle expanding unit 114 is integrated into the viewing window forming unit 112, the viewing angle expanding unit 114 exists in a concave part of the viewing window forming unit 112.

In addition, the second reflective optical system of the viewing angle expanding unit 114 may have an arrangement pitch based on a pixel pitch of the spatial light modulator 104. For example, in order to relay left eye and right eye hologram pattern images, the second reflective optical system may be arranged at a pitch corresponding twice a pixel pitch that generates each of the left eye and right eye patterns of the spatial light modulator 104. The arrangement pitch of a second reflective optical system according to the present disclosure is not limited thereto but may be modified in various forms.

Figure 5:
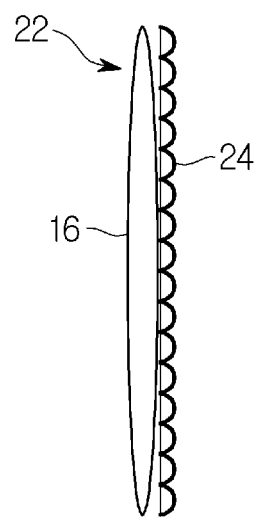
FIG. 5 is a view schematically illustrating a configuration of a conventional viewing window control module.

A viewing window control module according to the present disclosure and a convention viewing window control module 22 will be compared through FIG. 4 and FIG. 5. FIG. 5 is a view schematically illustrating a configuration of a conventional viewing window control module.

The viewing window control module 110 according to the present disclosure replaces refractive and/or diffractive optical systems constituting the conventional viewing window control module 110, that is, the rear filed lens 16 and the asymmetric scatter plate by a concave mirror and micro-concave mirrors arranged on the concave mirror. Herein, the asymmetric scatter plate 24 may be configured as a lenticular lens array. Specifically, the rear field lens 16, which is an optical element forming a viewing window, and a lenticular lens array used as the asymmetric scatter plate, which is an optical element expanding a viewing angle, may be replaced by a concave mirror and an arrangement of micro-concave mirrors, which are equivalent reflective optical systems respectively. When the asymmetric scatter plate 24 is a linear grating or a holographic diffuser, an arrangement of micro-concave mirrors according to the present disclosure an equivalent reflective optical system of the above-described element. In addition, since both the viewing window forming unit 112 and the viewing angle expanding unit 114 according to the present disclosure use not the conventional refractive and/or diffractive optical system but a reflective optical system, the problem of chromatic dependency caused by the conventional viewing window control module 110 according to the refractive optical system may be overcome.

Meanwhile, a distance of the viewing window 118, which is provided to the viewing window control module 110 according to the present disclosure, may be determined by a radius of curvature of the first reflective optical system 112. As illustrated in FIG. 3, when a first reflective optical system shaped in a concave mirror has a radius of curvature R, the viewing window forming unit 112 may have a same function as the conventional rear field lens 16 with the focal distance f=R/2. As an example, in case spherical light is irradiated, the distance d from the image plane 116 (reimaged SLM plane), on which the viewing window 118 is formed, to the viewing window 118 may be determined as in Equation (3), and a size w1 of the viewing window 118 may be the same as before. In the spherical light irradiation, it is assumed that a point light source is located a away from the image plane 116 (reimaged SLM plane).

$$d = aR/(2a-R) \qquad \text{Equation (3)}$$

As another example, in case plane light is irradiated, the viewing window 118 may be formed at a focal distance (d=R/2) of a concave mirror provided in the viewing window forming unit 112.

Figure 6:
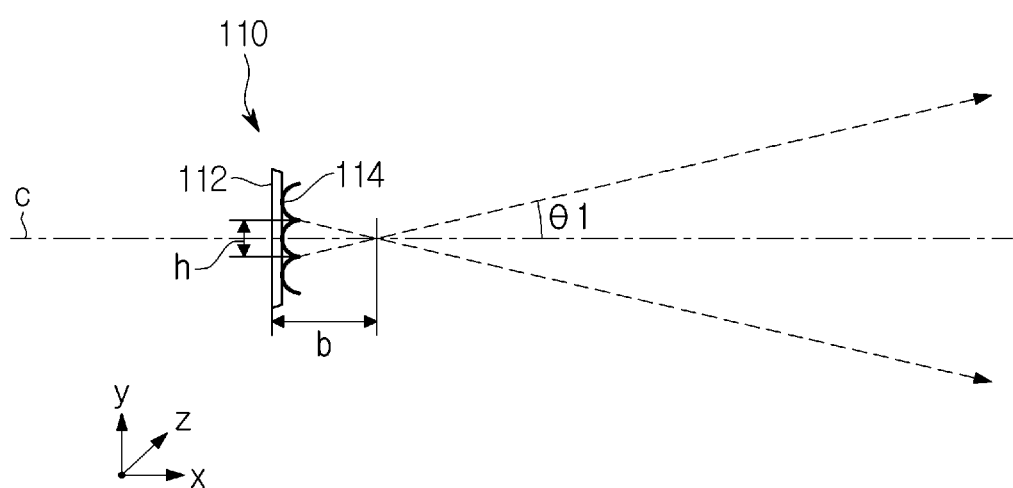
FIG. 6 is a view illustrating the concept of viewing window expansion.

In addition, as exemplified in FIG. 6, the viewing angle (θ1) may be determined based on a diameter (h) of a micro-concave mirror of the viewing angle expanding unit 114 and a radius of curvature (R') of the micro-concave mirror. Specifically, the diameter (h) of the micro-concave mirror of the viewing angle expanding unit 114 and the viewing angle (θ1) expanded by the radius of curvature (R'), which are designed variables illustrated in FIG. 6, may be determined by Equation (4). In Equation (4), as represented in FIG. 6, b is a distance to a point where irradiated lights are crossed, and it is assumed that a point light source a away from the image plane 116 (reimaged SLM plane) is used.

$$\theta 1 = \tan^{-1}(1 - R'/(2a)) * (h/R')$$ Equation (4)

In virtue of the viewing window control module 110 of the above-described hologram display device 110 according to the present disclosure, location inaccuracy is not caused by an asymmetric scatter plate, and no additional optical system needs to be installed. Furthermore, the problem of wavelength dependency may be solved.

Figure 7:
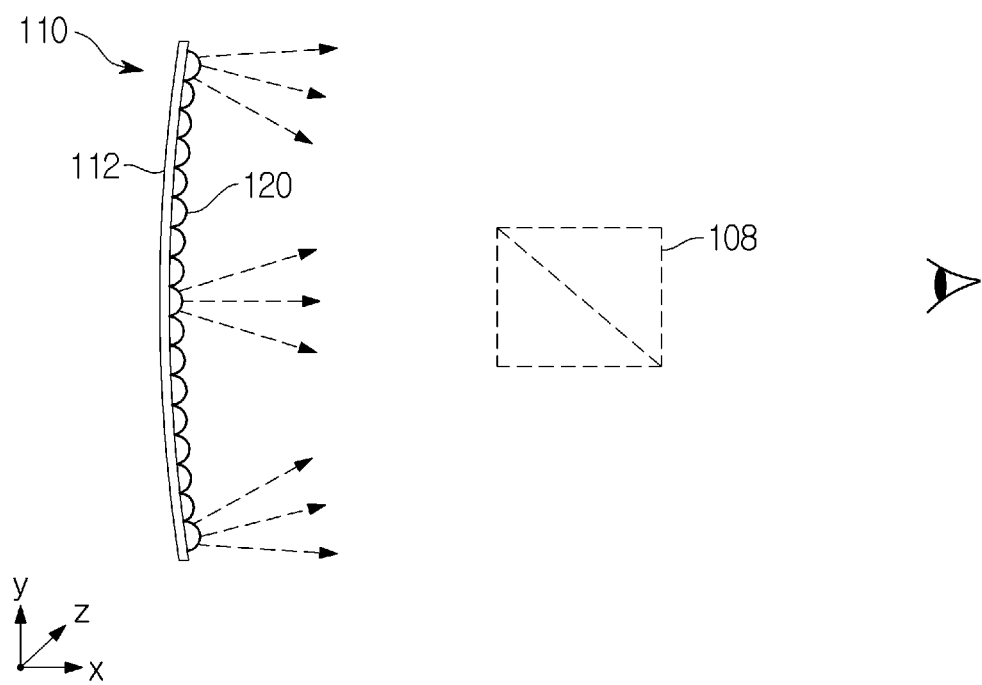
FIG. 7 is a view illustrating a configuration of a hologram display device according to a modified embodiment of the present disclosure.

FIG. 7 is a view illustrating a configuration of a hologram display device according to a modified embodiment of the present disclosure.

Except the detailed configuration of the viewing angle expanding unit 114, the hologram display device 110 according to an embodiment of FIG. 7 is substantially the same as the device 100 according to an embodiment of FIG. 2. Like in FIG. 2, the display device 100 according to FIG. 7 may include the light source 102, the spatial light modulator 104, the lens unit 106, the beam splitter 108, and the viewing window control module 110. As all the other components but the viewing window control module 100 are the same as in the embodiment of FIG. 2, the detailed description of the components will be omitted.

Like in the embodiment of FIG. 2, the viewing window control module 110 may include the viewing window forming unit 112 equipped with a first reflective optical system and the viewing angle expanding unit 120 which is arranged in one direction (y-axis direction of FIG. 7) on the viewing window forming unit 112 and has a second reflective optical system expanding a viewing angle of the viewing window 118.

The first reflective optical system of the viewing window forming unit 112 may be formed to have a light receiving surface with a concave mirror shape. The viewing angle expanding unit 120 may have a plurality of second reflective optical systems arranged sequentially in one direction (y-axis direction) at a predetermined pitch on the light receiving surface of the viewing window forming unit 112. A second reflective optical system may be configured as a micro-convex mirror. Like in the embodiment of FIG. 2, the viewing angle expanding unit 120 may be a reflective optical system that diffuses input light in one direction, for example, in the y-axis direction of FIG. 7, and outputs light without modulation in a direction perpendicular to the diffusing direction, for example, the z-axis direction of FIG. 7. In FIG. 7, the viewing angle expanding unit 120 is illustrated to be arranged in the y-axis direction but may be arranged according to an arbitrary angle in another example.

For the location accuracy of optical systems of the viewing window forming unit 112 and the viewing angle expanding unit 120 and the simplification of a device configuration, the viewing angle expanding unit 120 may be machined and formed directly on the viewing window forming unit 112. Accordingly, the viewing angle expanding unit 120 and the viewing window forming unit 112 may have a consistent optical relation to each other.

In addition, a micro-convex mirror of the viewing angle expanding unit 120 may have an arrangement pitch based on a pixel pitch of the spatial light modulator 104. For example, in order to relay left eye and right eye hologram pattern images, the micro-convex mirror may be arranged at a pitch corresponding twice a pixel pitch that generates each of the left eye and right eye patterns of the spatial light modulator 104. The arrangement pitch of a micro-convex mirror according to the present disclosure is not limited thereto but may be modified in various forms.

Meanwhile, unlike the light reflection path of the micro-concave mirror in FIG. 2, a micro-convex mirror of the viewing angle expanding unit 120 may expand a viewing angle in a viewing window by radiating irradiated light.

Figure 8:
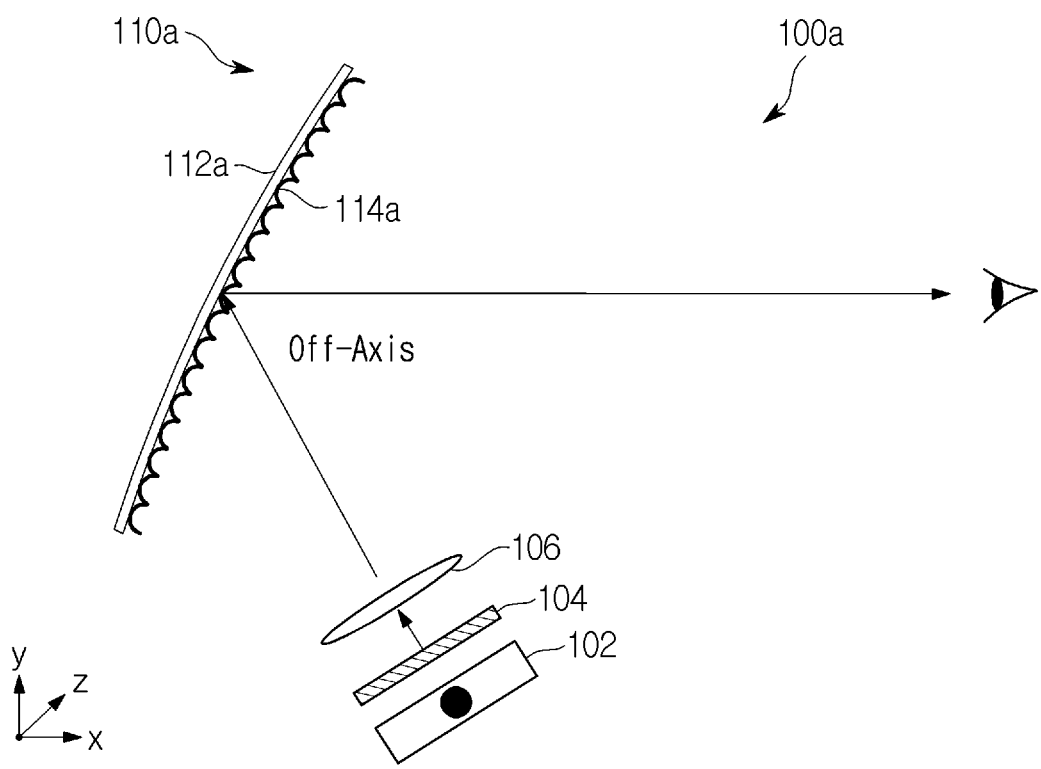
FIG. 8 is a view illustrating a configuration of a hologram display device according to another embodiment of the present disclosure.

FIG. 8 is a view illustrating a configuration of a hologram display device according to another embodiment of the present disclosure.

The hologram display device 100a according to an embodiment of FIG. 8 has a different proceeding course of incident light and emitted light from the one in the embodiment of FIG. 2. Like in FIG. 2, the display device 100a according to FIG. 8 may include the light source 102, the spatial light modulator 104, the lens unit 106, and the viewing window control module 110a. As the detailed functions of these components are substantially the same as in FIG. 2, the description will be omitted.

In the hologram display device 100a according to the present disclosure, as incident light and emitted light proceed not on a same axis but different axes, diffracted light emitted from the lens unit 106 may be irradiated off axis relative to the viewing window control module 110a. Thus, unlike the embodiment according to FIG. 2, the beam splitter may be omitted. For this implementation, the light source 102, the spatial light modulator 104 and the lens unit 106 may be arranged at a predetermined angle away from an axis (c1 of FIG. 9) of the viewing window control module 110a in order to irradiate diffracted light at a predetermined angle to the viewing window control module 110a.

Figure 9:
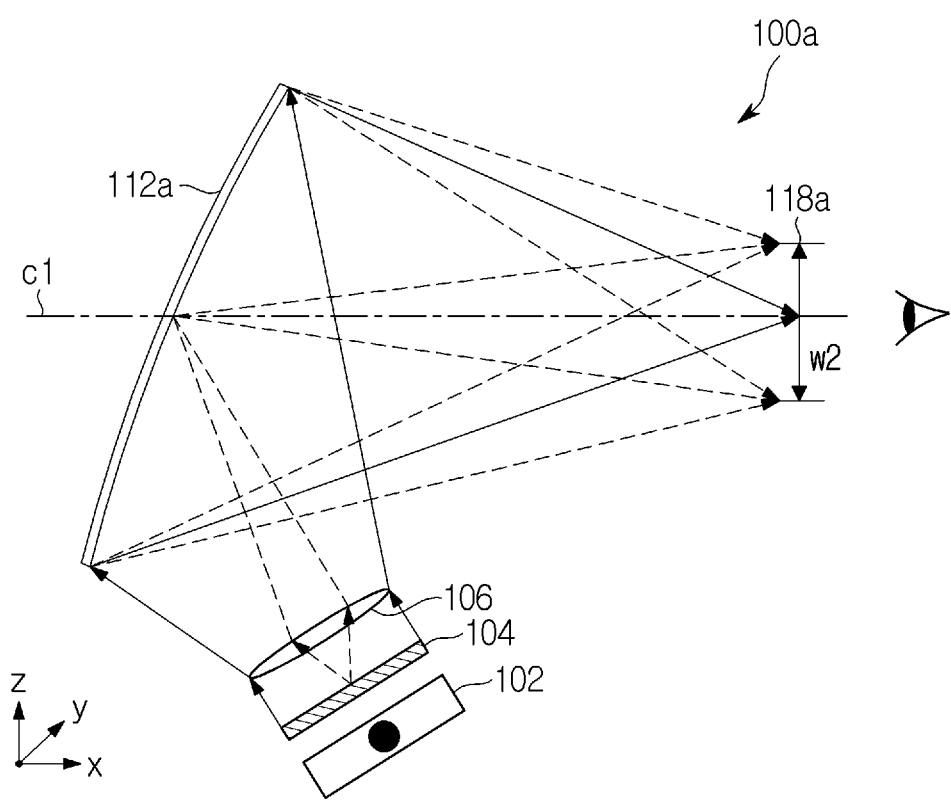
FIG. 9 is a view illustrating the formation of a viewing window by a viewing window forming unit according to another embodiment.
Figure 10:
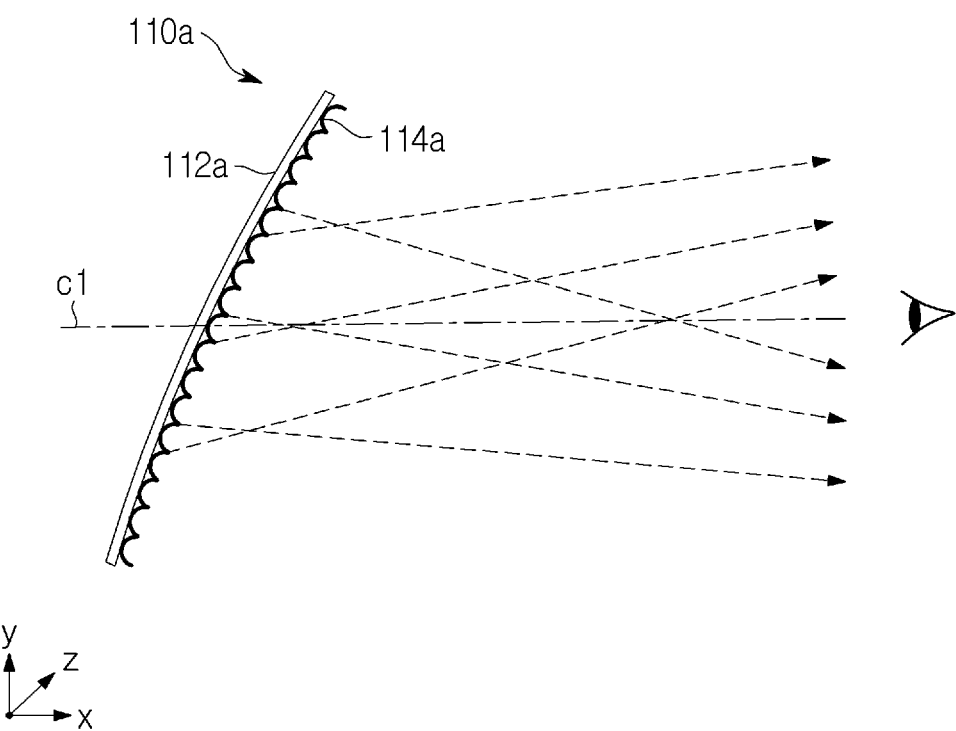
FIG. 10 is a view illustrating the expansion of a viewing angle by a viewing angle expanding unit according to another embodiment.

FIG. 9 is a view illustrating the formation of a viewing window by a viewing window forming unit according to another embodiment, and FIG. 10 is a view illustrating the expansion of a viewing angle by a viewing angle expanding unit according to another embodiment.

As exemplified in FIG. 8 to FIG. 10, the viewing window control module 110a may include a viewing window forming unit 112a equipped with a first reflective optical system that receives the emitted diffracted light and forms the viewing window 118a in a viewing region. In addition, the viewing window control module 110a may include a viewing angle expanding unit 114a having a second reflective optical system, which is arranged in one direction on the viewing window forming unit 112 (y-axis direction) and expands the viewing angle (θ1) of the viewing window 118a.

The first reflective optical system of the viewing window forming unit 112a may be formed to have a light receiving surface with a concave mirror shape. The viewing window expanding unit 114a may have a plurality of second reflective optical systems arranged sequentially in one direction (y-axis direction) at a predetermined pitch on the light receiving surface of the viewing window forming unit 112a. A second reflective optical system may be configured either as a micro-concave mirror or as a micro-convex mirror. In FIG. 8 to FIG. 10, the first and second reflective optical systems are illustrated in a semicircular shape with a similar symmetric curved surface and a same size as FIG. 2 to FIG. 4. However, depending on actual implementations, the first and second reflective optical systems may be configured to be the same as or different from FIG. 2. In order to enable an incidence angle and an emittance angle to be correctly set in the first and second reflective optical systems, the first reflective optical system may be configured as an asymmetric curved surface. Micro mirrors of the second reflective optical system may be formed as different curved surfaces, and each micro mirror may be fabricated as an asymmetric curved surface.

For the location accuracy of optical systems of the viewing window forming unit 112a and the viewing angle expanding unit 114a and the simplification of a device configuration, the viewing angle expanding unit 114a may be machined and formed directly on the viewing window forming unit 112a. In addition, the second reflective optical system of the viewing angle expanding unit 114a may have an arrangement pitch based on a pixel pitch of the spatial light modulator 104.

Hereinafter, referring to FIGS. 2 to 4 and FIG. 11, a hologram display method according to yet another embodiment of the present disclosure will be described using a hologram display device according to an embodiment. For convenience of explanation, the device 100 according to the embodiment of FIG. 2 is described for an illustrative purpose, but a device according to other embodiments may also implement the method in the same way substantially.

FIG. 11 is a flowchart for a hologram display method according to yet another embodiment of the present disclosure.

First, the light source 102 may output an input light (S105).

Next, the spatial light modulator 104 may modulate the input light by diffracting the input light (S110).

The spatial light modulator 104 may vary a hologram pattern displayed on each pixel according to control of an SLM controller (not shown).

Next, the lens unit 106 may focus and emit the diffracted light (S115).

Next, the viewing window control module 110 may form the viewing window 118 in the z-axis direction by reflecting the emitted light and may diffuse a viewing angle (θ1) in the y-axis direction (S120).

Specifically, the viewing window forming unit 112 equipped with a first reflective optical system may form the viewing window 118 in a viewing region by receiving the diffracted light. The viewing angle expanding unit 114 having a second reflective optical system, which is arranged in one direction on the viewing window forming unit 112, may expand the viewing angle (θ1) of the viewing window 118.

In the method according to the present disclosure, as the viewing angle expanding unit 114 is machined directly on the viewing window forming unit 112, an expanded viewing angle may be secured, and the location accuracy of optical systems in the viewing window forming unit 112 and the viewing angle expanding unit 114 and the simplification of a device configuration may be realized. In addition, according to the method according to the present disclosure, since both the viewing window forming unit 112 and the viewing angle expanding unit 114 according to the present disclosure use not the conventional refractive and/or diffractive optical system but a reflective optical system, the problem of chromatic dependency caused by the conventional viewing window control module 110 according to the refractive optical system may be overcome.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on a device or a computer, a non-transitory computer-readable medium having such software or commands stored thereon and executable on the device or the computer.

What is claimed is:

1. A viewing window control module applied to a hologram display device, the viewing window control module comprising:
    a viewing window forming unit having a first reflective optical system that receives an incident light and forms a viewing window in a user's viewing region; and
    a viewing angle expanding unit having a second reflective optical system that is arranged in one direction on and integrated with the viewing window forming unit and expands a viewing angle of the viewing window,
    wherein the viewing angle expanding unit has a plurality of second reflective optical systems that are sequentially arranged at a predetermined pitch in the one direction on a light receiving surface of the viewing window forming unit,
    wherein the second reflective optical system has an arrangement pitch based on a pixel pitch of a spatial light modulator from which the incident light is output.

2. The viewing window control module of claim 1, wherein the viewing angle expanding unit is machined and formed on the viewing window forming unit.

3. The viewing window control module of claim 1, wherein the first reflective optical system is configured in a concave mirror shape.

4. The viewing window control module of claim 3, wherein a distance of the viewing window is determined by a radius of curvature of the first reflective optical system.

5. The viewing window control module of claim 1, wherein the second reflective optical system is configured as a micro-concave mirror.

6. The viewing window control module of claim 5, wherein the viewing angle is determined by a diameter of the micro-concave mirror and a radius of curvature of the micro-concave mirror.

7. The viewing window control module of claim 1, wherein the second reflective optical system is configured as a micro-convex mirror.

8. A hologram display device comprising:
    a spatial light modulator configured to include a plurality of pixels and to modulate an input light into a diffracted light;

a lens unit configured to emit the diffracted light; and a viewing window control module configured to provide the emitted diffracted light to a user's viewing region, wherein the viewing window control module comprises:

a viewing window forming unit having a first reflective optical system that receives the emitted diffracted light and forms a viewing window in the viewing region; and a viewing angle expanding unit having a second reflective optical system that is arranged in one direction on and integrated with the viewing window forming unit and expands a viewing angle of the viewing window, wherein the viewing angle expanding unit has a plurality of second reflective optical systems that are sequentially arranged at a predetermined pitch in the one direction on a light receiving surface of the viewing window forming unit, wherein the second reflective optical system has an arrangement pitch based on a pixel pitch of the spatial light modulator.

9. The hologram display device of claim 8, wherein the viewing angle expanding unit is machined and formed on the viewing window forming unit.

10. The hologram display device of claim 8, wherein the first reflective optical system is configured in a concave mirror shape.

11. The hologram display device of claim 10, wherein a distance of the viewing window is determined by a radius of curvature of the first reflective optical system.

12. The hologram display device of claim 8, wherein the second reflective optical system is configured as a micro-concave mirror.

13. The hologram display device of claim 12, wherein the viewing angle is determined by a diameter of the micro-concave mirror and a radius of curvature of the micro-concave mirror.

14. The hologram display device of claim 8, wherein the second reflective optical system is configured as a micro-convex mirror.

15. The hologram display device of claim 8, wherein the emitted diffracted light is configured to be irradiated on-axis to the viewing window control module when a beam splitter is used, and the emitted diffracted light is configured to be irradiated off-axis to the viewing window control module when no beam splitter is used.

16. A method for displaying hologram comprising:

modulating, by a spatial light modulator including a plurality of pixels, an input light into a diffracted light;

emitting, by a lens unit, the diffracted light; and providing, by a viewing window control module, the emitted diffracted light to a user's viewing region, wherein the providing to the viewing region comprises:

receiving the emitted diffracted light, by a viewing window forming unit having a first reflective optical system, and forming a viewing window on the viewing region; and expanding, by a viewing angle expanding unit having a second reflective optical system arranged in one direction on and integrated with the viewing window forming unit, a viewing angle of the viewing window, wherein the viewing angle expanding unit has a plurality of second reflective optical systems that are sequentially arranged at a predetermined pitch in the one direction on a light receiving surface of the viewing window forming unit, wherein the second reflective optical system has an arrangement pitch based on a pixel pitch of the spatial light modulator.

* * * * *